United States Patent [19]

Clarke et al.

[11] 4,098,622

[45] Jul. 4, 1978

[54] EARTH-WORKING IMPLEMENT

[75] Inventors: Theodore M. Clarke, Western Springs; Gordon H. Walter, Darien, both of Ill.

[73] Assignee: International Harvester Company, Chicago, Ill.

[21] Appl. No.: 686,616

[22] Filed: May 14, 1976

[51] Int. Cl.² ............................................. C22C 38/00
[52] U.S. Cl. ................................... 148/36; 75/123 E; 75/123 R; 75/126 G; 75/128 E
[58] Field of Search .................. 148/36, 115 R, 12 F; 75/123 E, 123 R, 126 G, 128 E, 124

[56] References Cited

U.S. PATENT DOCUMENTS

| | | | |
|---|---|---|---|
| 2,343,069 | 2/1944 | Luerssen | 75/123 E |
| 2,814,580 | 11/1957 | Hoover | 148/36 |
| 3,661,537 | 5/1972 | Aronson et al. | 75/123 E |
| 3,666,570 | 5/1972 | Korchynsky et al. | 75/123 E |
| 3,811,873 | 5/1974 | de Barbadillo, II | 148/36 |
| 3,816,103 | 6/1974 | Link, Jr. et al. | 148/36 |
| 3,876,475 | 4/1975 | Ramquist | 75/126 G |
| 3,973,950 | 8/1976 | Itoh et al. | 75/123 E |
| 3,982,969 | 9/1976 | Koros et al. | 75/123 E |

FOREIGN PATENT DOCUMENTS

| | | | |
|---|---|---|---|
| 203,420 | 3/1955 | Australia | 75/123 E |
| 2,447,137 | 4/1975 | Fed. Rep. of Germany | 75/126 G |

OTHER PUBLICATIONS

"Sulfide Shape Control in High Strength Low Alloy Steels," Luyckx, et al., Metallurgical Transactions, vol. 1, 12/70; pp. 3341–3350.

"Effects of Rare Earth Additions on Plain-Carbon Steels," Barnard, U.S. Dept. Int., Bureau of Mines Report #6907, 1967.

Primary Examiner—Arthur J. Steiner
Attorney, Agent, or Firm—Frederick J. Krubel; F. David AuBuchon

[57] ABSTRACT

An earth-working implement of high carbon-high hardness steel wherein the globular shape of the sulfides is retained during the manufacturing process by the addition of strong sulfide-forming additives whereby the "fracture toughness" in the rolling direction is substantially increased thereby resulting in a high strength implement possessing superior fracture resistance properties in all directions including the rolling direction.

8 Claims, 14 Drawing Figures

EARTH-WORKING IMPLEMENT

This invention relates to the manufacture of earth-working implements and, more particularly, to an agricultural disk made from a straight-rolled, high carbon steel which exhibits equivalent or better fracture behavior characteristics than agricultural disks manufactured from cross-rolled steel.

It is well known that agricultural disks utilizing steel plates or sheets which are made by the conventional straight rolled process tend to fracture in substantially a straight line path because the toughness of the finished disk is less in the longitudinal direction (the rolling direction) than in the transverse direction. Straight line fractures of agricultural implement disks in actual use are generally catastrophic and require the immediate replacement of the broken disks because such damaged disks can cause severe damage to the harrow or other farm implement in which the disks are installed due to loss of clamp load on the remaining parts of the disk gang. Furthermore, if the broken disks are not replaced immediately, "plugging" of the disc harrow oftentimes occurs with continued use of the farm implement. Additionally, the task of disassembling the disk gang to remove the broken disks and reassembling the disk gang with undamaged disks is not only time-consuming but vexatious as well.

The desirablity of controlling the directional fracture characteristics of agricultural disks and the problems involved to achieve directional fracture control have been known for some time. The solution to such directional fracture control problems has been afforded to a large extent by cross-rolling the steel plate or sheet from which the disks are ultimately made and to a lesser extent by a process which includes an austempering heat treatment step of straight or single-rolled steel, as disclosed in U.S. Pat. No. 2,814,580. Agricultural implement disks made from cross-rolled steel do, however, occasionally fail by delamination parallel to the surfaces of the disk as a result of their lenticular shaped inclusions. Furthermore, cross-rolled steel plates for manufacturing agricultural implement disks of many sizes are relatively unavailable from steel suppliers since the installation and operation of a steel plate cross-rolling facility is very costly.

Accordingly, in order to overcome the above and other performance and manufacturing shortcomings of agricultural implement disks presently available commercially and to improve the performance and increase the operating life thereof means for completely eliminating the fracture directionality in agricultural implement disks made from straight-rolled, high hardness steels was devised. It has been discovered that by controlling the sulfide morphology of the steel utilized in the manufacture of agricultural implement disks, the desired control of fracture directionality could be accomplished and resulted in agricultural implement disks that will not fracture in a straight line, brittle fashion in use but which only develop short ductile tears under conditions of extreme load. While the principle of sulfide morphology control has been used by others, e.g., U.S. Pat. No. 3,666,570, to improve formability and through thickness ductility in low carbon structural steels which normally fracture in a ductile manner, it has never been applied to high hardness-high carbon steel. The profound influence of globular sulfide morphology on the fracture toughness of high hardness-high carbon steel is not obvious for material normally considered to fracture in a brittle manner.

SUMMARY OF THE INVENTION

One of the primary objectives of the present invention is the provision of an agricultural implement disk made from straight-rolled, high carbon-high hardness steel wherein the inherent straight line fracture directionality characteristic present in disks made from such steel has been eliminated by chemical additions to the bath of molten steel from which the disks are made which additions form refractory type globular sulfides in the steel that are substantially retained in that form in the finished product.

A further object of the invention is to produce a heat treated disk made from straight-rolled, high carbon steel which has improved resistance to fracture in all directions and possess a relatively high hardness.

Another objective is to provide an earth-working implement made of a straight-rolled, high carbon-high hardness steel which, from performance and operating life standpoints, is far superior to the implements made from known materials and by known manufacturing processes.

The foregoing, and other important objects and desirable features, inherent in and encompassed by the invention, together with many of the purposes and uses thereof, will become readily apparent from a reading of the ensuing description in conjunction with the annexed drawings and photographs.

DESCRIPTION OF THE PREFERRED EMBODIMENT

As pointed out hereinbefore, the present invention is primarily concerned with the provision of an earthworking implement, such as an agricultural implement disk, made from a high carbon steel, namely, steel containing more than 0.65% by weight of carbon, nominally SAE 1085 steel, wherein the finished disk made from such steel has a relatively high level and uniformity of toughness in all directions. This is accomplished primarily by making additions of certain chemical elements of predetermined amounts to the molten bath of high carbon steel, containing more than 0.65% by weight of carbon, during the steel making operation. The chemical element additions, the particular chemical elements and the amounts of such additions will be pointed out hereinafter, combine with the sulphur and oxygen of the molten steel bath to form globular shaped oxysulfides which retain their globular shape during hot rolling of the steel into plate form suitable for manufacturing agricultural implement disks.

The technology for controlling the sulfide shape is well established for low carbon structural steels. Heretofore, the desirability of controlling the sulfide shape in high carbon steel by chemical element additions in order to provide a material suitable for manufacturing agricultural implement disks possessing superior qualities has not been appreciated by others. Thus, sulfide shape control techniques have never been applied to high carbon steels for this purpose.

The results of a large number of fracture toughness studies, conducted on a multitude of agricultural implement disk samples, made of a variety of different materials and manufactured in accordance with different manufacturing processes, indicate that directionality of fracture toughness is a function of the percentage of the sulfide inclusions which remain in globular form or shape after the ingot is hot rolled to a thickness suitable for the manufacture of agricultural implement disks. It was found that those agricultural disk specimens which contained substantially 100% globular sulfide inclusions exhibited substantially no directionality with respect to fracture toughness.

At the outset of the agricultural implement disk research which resulted in the present invention, a multitude of disk specimens were made from steel plates which had been hot straight-rolled to five-sixteenths inch for testing purposes. Each of the plates from which test disk specimens were made, in turn, was obtained from a molten steel batch into which one of a series of various additives was added. The series of additives included Mischmetal, rare earth silicides, ferrotitanium, and Hypercal (CA, alloy). As a result of such disk specimen preparation, a large number of fracture toughness test specimens were obtained in which the percent of sulfides retained therein in globular form after the hot rolling operation was in a range from 40% to 100%.

Agricultural implement disks may be formed from a suitable billet which is flattened by rolling, or more likely the disk may be cut from sheet steel which has been rolled in a single direction, the terminology for such a process being "straight rolled". The disks, alternatively, may be subjected to a rolling mill technique whereby the rolls pass in a plurality of directions over the metal, the terminology for such process being "cross rolling". It is not deemed necessary to elaborate upon the manner in which the rolling is accomplished since such rolling is conventional and forms no part of the present invention. The rolling operation usually takes place between rolls under pressure through which the steel sheet or billet is fed.

Figure 8A:
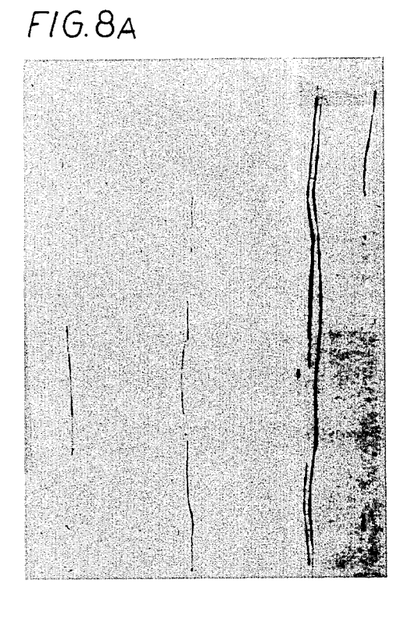
FIG. 8A is a 100X magnification photograph or photomicrograph illustrating the orientation, distribution and shape of the retained sulfide inclusion of a disk sample made of conventional straight-rolled disk steel; the typical sulfide inclusions being in the form of elongated stringers in the rolling direction and oriented along lines substantially parallel to the rolling direction.
Figure 8B:
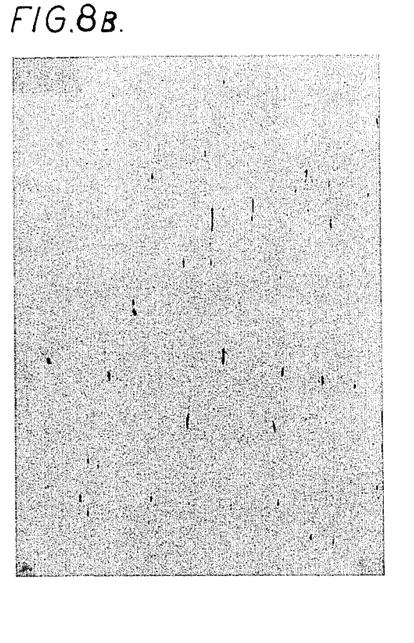
FIG. 8B is a 100X photomicrograph similar to FIG. 8A with the exception that the disk sample was made of cross-rolled steel; the sulfide inclusions are shown in one rolling direction.
Figure 8C:
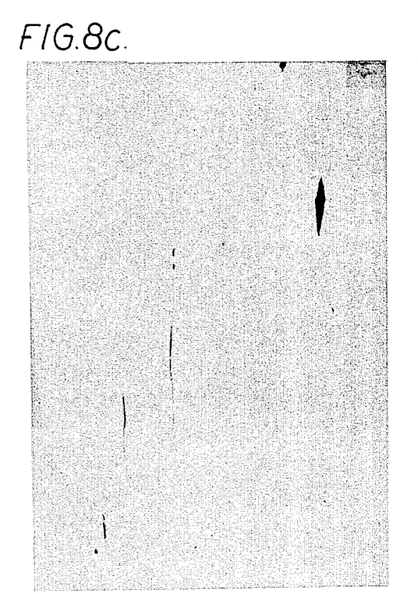
FIG. 8C is a photomicrograph of the same disk steel sample of FIG. 8B but at a higher magnification.
Figure 8D:
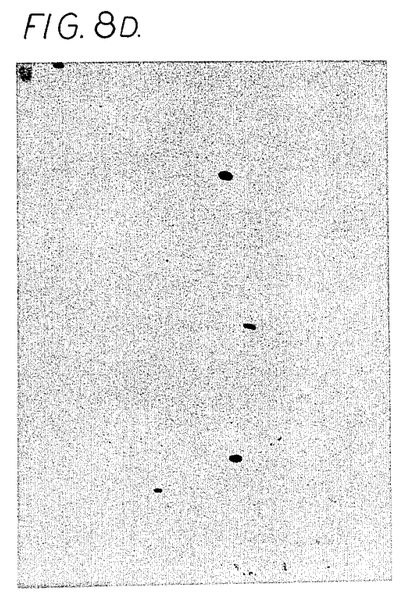
FIG. 8D is a 100X photomicrograph of a steel sample of a disk embodying the invention showing the typical retained sulfide inclusions which did not deform or elongate during the rolling process.

In the straight rolling or disk steel, such as untreated SAE 1085 steel, the rollers pass over the steel sheet in one direction only. The disk blanks are then cut from the sheets and subsequently formed into disks. By this process, as shown in FIG. 8A, the sulfide inclusions are substantially all elongated in shape and are all substantially linearly directed across the disk in substantially parallel fashion. By cross rolling the steel sheet, as has been done in the past, the inclusions are uniformly flattened in all directions on the plane of rolling and are generally lenticular in shape. The fact that the shape of the inclusions is lenticular rather than stringer-like is believed to be an important reason for achieving the desirable results which have been obtained in the past with cross rolled disks over disks made by a straight rolling process.

During our experiments, a disk steel material was made wherein the sulfide inclusions retained therein were all in globular form. Steel known as SAE 1085 steel was treated with Mischmetal in a manner which will be pointed out hereinafter. The steel batch was made in a basic oxygen furnace as part of a 140 ton heat. The turned down chemical analysis, by weight, was as follows: C 0.84%, Mn 0.58%, P 0.19%, S 0.024% at a temperature of 2,895° F.

While the 140 ton heat was being tapped into the ladle, the following substances were added to the heat in the indicated amounts:

| Ferro silicon (50% silicon) | 1250 pounds |
| Regular ferromanganese | 800 pounds |
| M.S. manganese | 150 pounds |
| Aluminum (cut wire) | 160 pounds |
| Metallurgical coke | 75 pounds |

The ladle analysis at 2785° F. was as follows: C 0.82%, Mn 0.76%, P 0.024%, S 0.016%, Si 0.22%, Ni 0.03%, Cr 0.03%, Mo 0.01%, Al 0.032%.

A 5 ton ingot poured from the above mentioned 140 ton heat was treated with conventional Mischmetal in the following manner. Mischmetal in an amount of nine pounds was added to the five ton ingot by throwing two-ounce balls of the Mischmetal into the ingot mold as it was being filled. The Mischmetal addition step was started after the bottom of the ingot mold was covered with molten steel and was continued in a steady manner until the mold was three-quarters full. The Mischmetal contained approximately 45% cerium, by weight.

The fracture toughness specimens of the aforementioned experimental ingot to which the sulfide inclusion shape-control agent comprising Mischmetal was added were heat treated by being austempered. Part of the experimental test ingot was also used to make fracture toughness specimens which were heat treated by being quenched and tempered. The austempering heat treatment process was done in a production three stage austempering unit. The three stage austempering procedure consisted of austenitizing at 1600° F. for four minutes in a salt bath, quenching into a salt bath at 550° F. for one minute to get the steel past the knee of the transformation range and then quenching into another salt bath at 700° F. for 22 minutes resulting in a bainitic microstructure substantially free from pearlitic microstructure at Rockwell "C" - 40 to 42. The quench and temper treatment procedure consisted of austenitizing at 1500° F., quenching in oil at 110° F., and tempering at 935° F. to a hardness of Rockwell "C" - 40 to 42. It is important in order to achieve the objects of the invention that regardless of what heat treatment process is used, the resulting disks should have a primarily bainitic microstructure or a primarily martensitic microstructure and should be substantially free from a pearlitic microstructure.

The fracture toughness of disk specimens made from steel, treated with various sulfide inclusion shape-control agents, having different percentages of retained globular sulfide inclusions, straight rolled, conventional or untreated SAE 1085 steel having elongated retained sulfide inclusions (0% retained globular sulfide inclusions), and cross-rolled SAE 1085 steel having lenticular-shaped, retained sulfide inclusions were compared using a fracture mechanics test method found by previous studies to accurately correlate with expected service performance of agricultural implement disks.

The following Tabulation is a summary of the results of the fracture toughness tests conducted on the various disk specimens.

SUMMARY OF RESULTS OF FRACTURE TOUGHNESS TESTS

| Sample | Sulfide Inclusions Shape * | Heat Treatment | Hardness RC | Fracture Toughness (Avg.)$K_c$, ksi $\sqrt{\text{in.}}$ Long.** | Trans. | Toughness Ratio Long./Trans. |
|---|---|---|---|---|---|---|
| Plain S.A.E. 1085 Steel | 100% Elongated | Austemper Quench & Temper | 40 – 41 40 – 41 | 62 57 | 105 112 | .59 .51 |
| Titanium Treated S.A.E. 1085 | 40% Globular 60% Elongated | Austemper Quench & Temper | 40 – 42 40 – 42 | (76)*** 86 | (83)*** 123 | (.91)*** .70 |
| Rare Earth Silicide Treated S.A.E. 1085 | 50% Globular 50% Elongated | Austemper Quench & Temper | 40 – 42 40 – 41 | 91 93 | 133 114 | .68 .82 |
| 'Hypercal' Treated S.A.E. 1085 | 60% Globular 40% Elongated | Austemper Quench & Temper | 41 – 42 40 – 41 | 100 88 | 133 128 | .75 .69 |
| Mischmetal Treated S.A.E. 1085 | 100% Globular | Austemper Quench & Temper | 40 – 41 40 – 41 | 119 115 | 121 120 | .98 .96 |
| Cross-Rolled S.A.E. 1085 Disk Steel | Lenticular | Quench & Temper | 42 – 43 | 92 | 110 | .84 |

*Visual estimate with the aid of a microscope at 100X.
**Direction of the induced crack in the rolling direction.
***Microstructure may be less than the desired 100% bainite.

Figure 11:
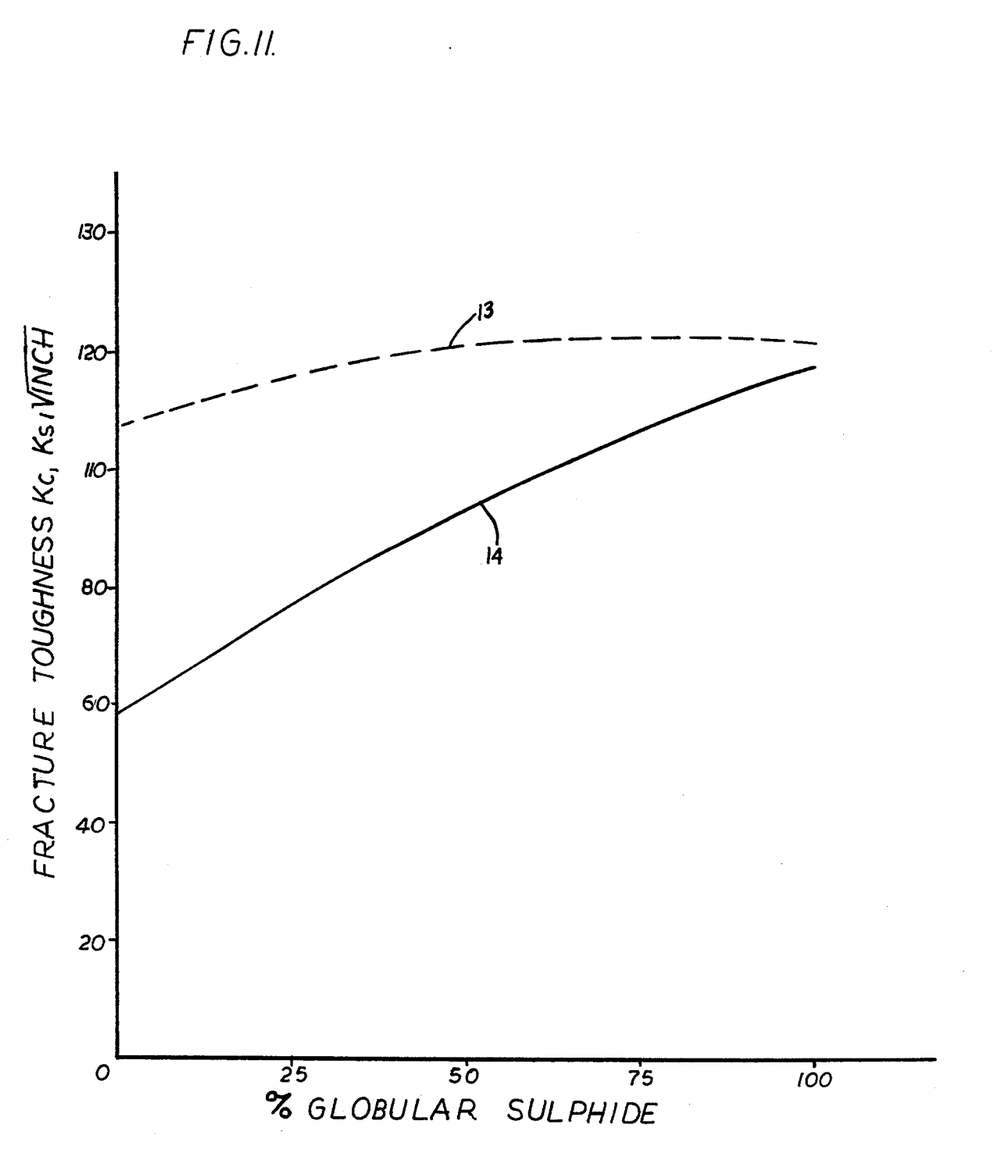
FIG. 11 is a chart illustrating fracture toughness in directions parallel and perpendicular to the rolling direction of a multitude of disk steel samples having different percentages of globular sulfide inclusions retained therein.

The above Tabulation clearly indicates that the tendency for directional fracture behavior in agricultural implement disks, as evidenced by the ratio of longitudinal to transverse fracture toughness, will decrease as the percentage of retained sulfide inclusions with globular shape increases. Such results are graphically illustrated in the chart shown in FIG. 11. The broken line 13 indicates the fracture toughness of the disk specimens measured perpendicular to the primary rolling direction of the disk material and the full line 14 is the fracture toughness of the same disk specimens measured parallel to the primary rolling direction of the disk material. The chart of FIG. 11 dramatically indicates the relatively large directional property difference for straight rolled, plain SAE 1085 steel in comparison with disk steel made in accordance with the present invention wherein such directional property difference is substantially zero and fracture behavior is essentially isotropic or nondirectional. The fracture toughness of the test specimens of the present invention is relatively high as measured in a direction perpendicular or transverse to the primary rolling direction and such relatively high fracture toughness is substantially duplicated as measured in a direction parallel or longitudinal to the primary rolling direction.

The fracture toughness test results indicated that the tendency for directional fracture behaviour in the disks, as evidenced by the ratio of longitudinal to transverse fracture toughness, will decrease as the percentage of sulfide inclusions with globular shape increases regardless of the kind and amount of sulfide inclusion shape control agent or additive used. The data also indicated that disks with 100% globular sulfide inclusions should be superior to disks made from cross-rolled steel as evidenced by the higher toughness ratio and toughness values exhibited by the experimental steel with 100% globular sulfide inclusions. Elimination of elongated sulfide inclusions significantly improved fracture toughness of the disk specimen in the rolling direction as well as substantially eliminated fracture directionality therein.

It is to be understood that any sulfide inclusion shape-control agent such as Mischmetal, titanium, rare earth silicide and "Hypercal" could be used to produce non-deformable globular sulfide inclusions in disk steel without departing from the spirit and scope of the invention. Furthermore, it is to be understood that the amount of sulfide inclusion shape-control agent used when preparing a batch of disk steel depends on the percentage of sulfide inclusions in globular form desired to be retained in the steel after the rolling operation.

Figure 9:
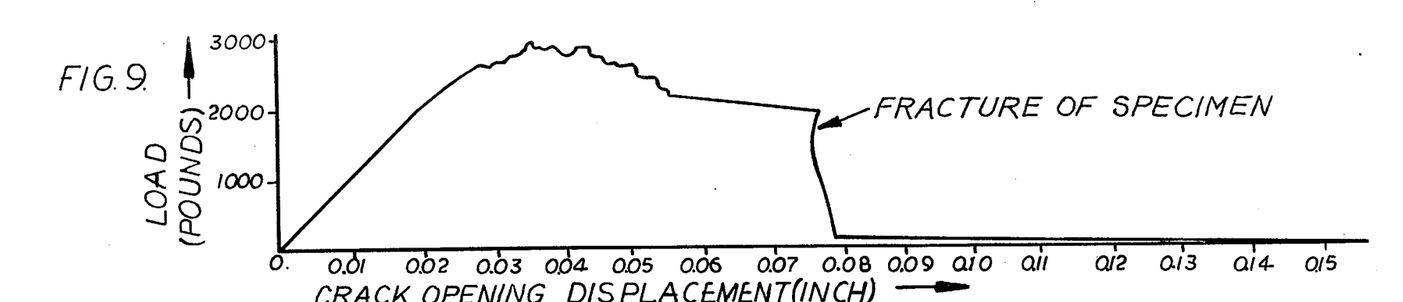
FIG. 9 is a load-displacement chart illustrating fracture toughness for untreated or conventional S.A.E. 1085, austempered steel disk material.
Figure 10:
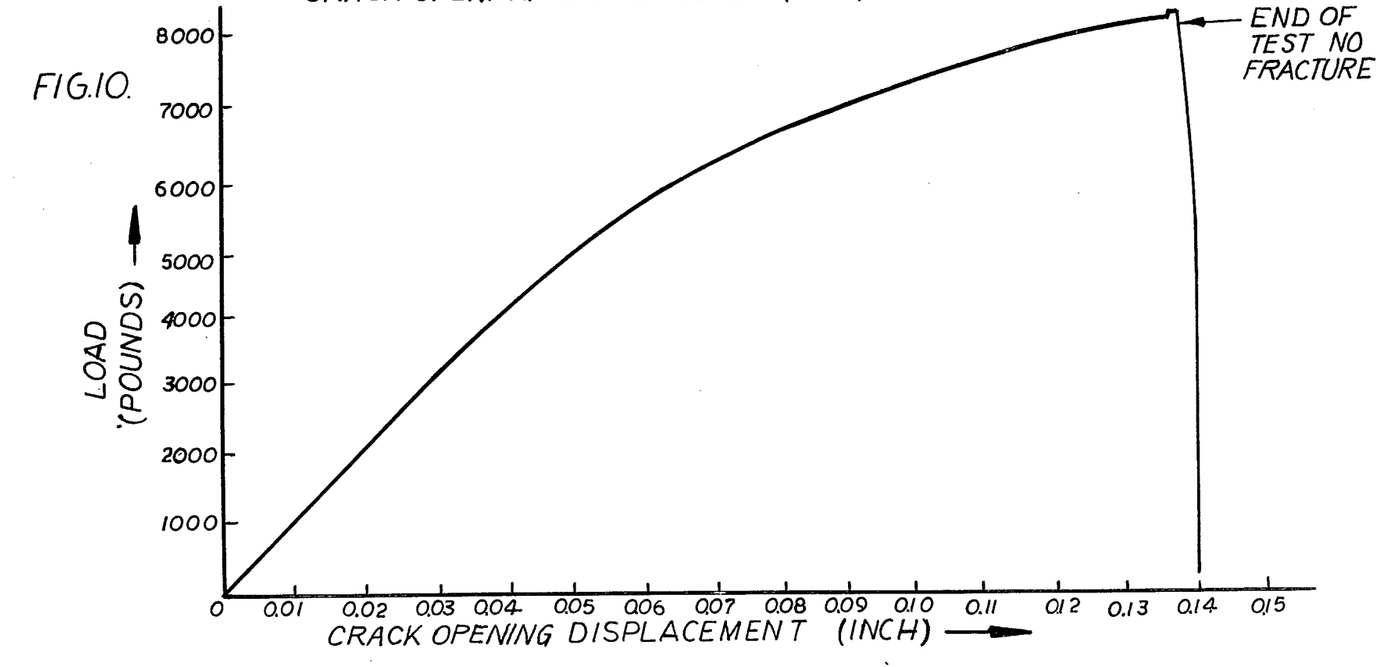
FIG. 10 is a load-displacement chart illustrating fracture toughness for steel disk material embodying the present invention.

The fracture toughness of the Mischmetal treated, SAE 1085 straight rolled disk steel was better than that of the cross-rolled disk steel as evident from the above Tabulation. Mischmetal treated, SAE 1085 steel disk specimens fractured in a plane stress or ductile manner indicating high resistance to fracture propagation whereas by contrast and as evident by viewing FIG. 5, the straight rolled, untreated SAE 1085 steel specimens exhibited a plane strain or brittle fracture and thus, poor resistance to fracture propagation. As will be appreciated after viewing and comparing the curves shown in FIGS. 9 and 10, which are Load-Crack Opening Displacement charts representative of fracture toughness test for straight rolled, Mischmetal treated SAE 1085 steel test specimens and for straight rolled, untreated SAE 1085 steel test speciment, steel disks embodying the invention will be capable of withstanding considerably greater loads and a larger deformation than untreated steel disks before a fracture occurs in the disk.

Delamination failures of cross-rolled steel disks in field service are attributed to the flattened discus or lenticular shape of the retained sulfide inclusions which, it is believed, have a far greater notch effect than if the same volume of sulfide inclusions were present in compact globular shape. Although the fracture toughness test conducted did not evaluate resistance to delamination type fractures in the plane of rolling, straight rolled, SAE 1085 steel treated to maintain 100% of the sulfide inclusions in globular form should have far greater resistance to this type of fracture than conventional or cross-rolled steel.

Figure 3:
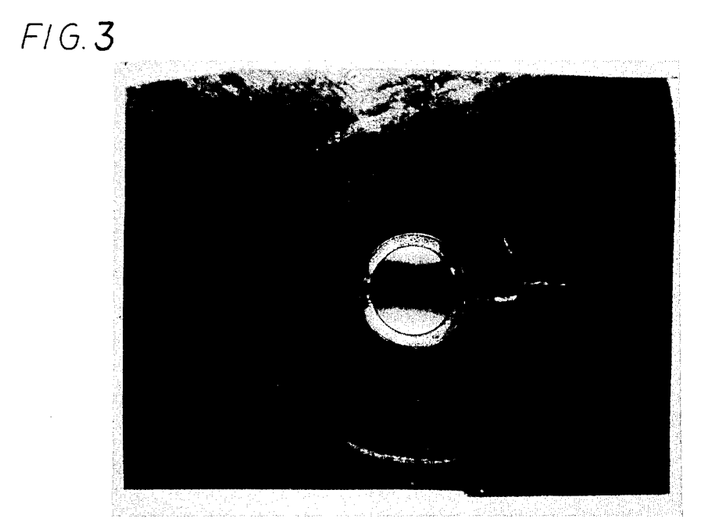
FIG. 3 is a photographic view of the central portion of a conventional austempered agricultural implement disk specimen made from straight-rolled steel showing the results of a ball fracture test.
Figure 4:
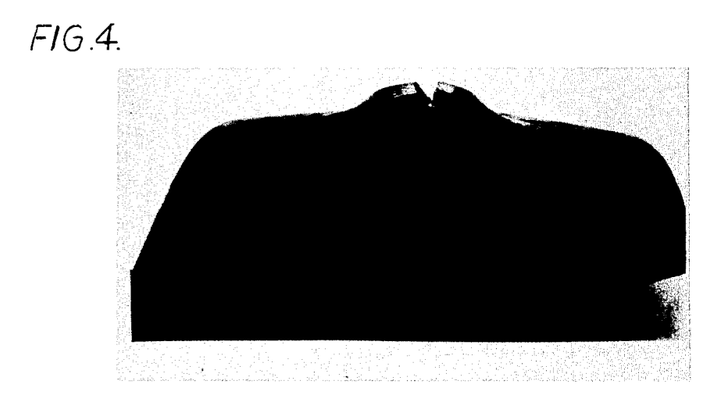
FIG. 4 is a photographic view of the disk specimen shown in FIG. 3 taken from an oblique angle in order to better illustrate the degree of cone-shaped deformation resulting from the ball fracture test.
Figure 5:
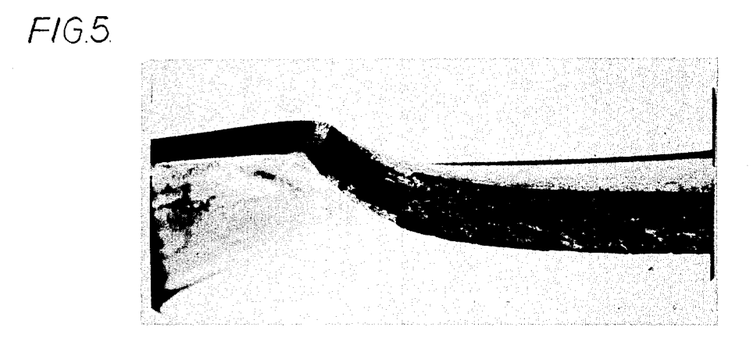
FIG. 5 is a relatively low magnification photographic view of a surface of the disk specimen illustrated in FIG. 3 at one of the fractures thereof showing the brittle nature of the fracture.
Figure 6:
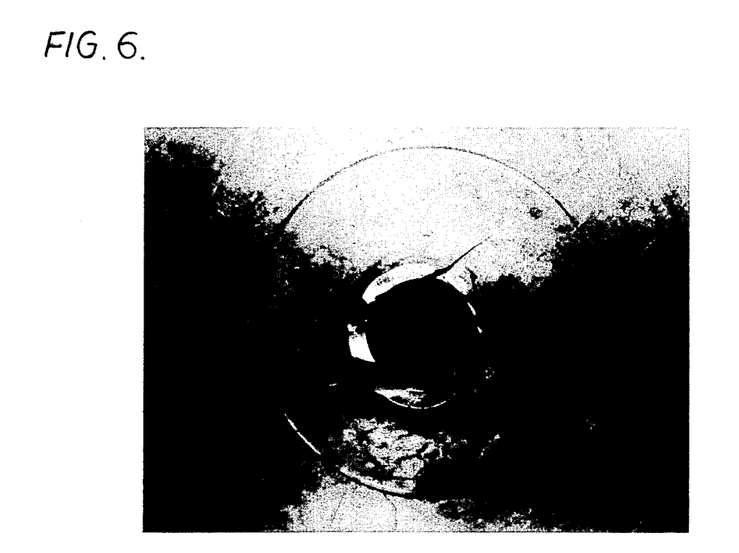
FIG. 6 is a view similar to FIG. 3 illustrating the results of a ball fracture test on the central portion of an austempered disk specimen embodying the invention wherein substantially all of the retained sulfides are in globular form.

Actual field tests and the results of the fracture ball tests definitely prove that a disk embodying the invention will have the desirable feature referred to in this application as "non-directionality". In a broad sense this term means that when a fracture occurs in a disk, progression of the fracture occurs in a random direction with respect to the rolling direction. As pointed out hereinbefore, this result is particularly desirable in the field under severe service conditions since it prevents large pieces from breaking out of any disk. Small sections which break out of a "non-directional" disk will permit the continued use of the disk for a period of time without requiring the immediate disassembly and reassembly of the disk gang. The fracture ball test, which was used to test the disk specimens, is a known production method for toughness evaluation. FIGS. 3 and 6 show an untreated, straight rolled SAE 1085 steel disk and an improved disk embodying the invention, respectively, both having been subjected to the same approved fracture ball test. In the fracture ball test utilized for testing disk specimens, a hardened steel ball is forced through a drilled hole in the disk specimen, the drilled hole being of lesser diameter than the ball. In actuality, a one-inch diameter hardened steel ball is forced through a chamfered one-half inch diameter hole drilled through the central or hub portion 12 of the disk specimen. During the testing operation the hole is centered over a three-inch inside diameter supporting ring. FIGS. 3, 4, and 5 show dramatically the straight line, directional characteristic of the breakage or fracture of a typical austempered straight rolled, untreated SAE 1085 steel disk specimen. FIG. 5, as pointed out hereinbefore, clearly shows that the fracture follows a substantially straight line and is of the plane strain or brittle type and such fracture is in the rolling direction. A similar straight line fracture in the rolling direction frequently occurs in fracture ball tests of quench and tempered straight rolled steel disks.

Figure 7:
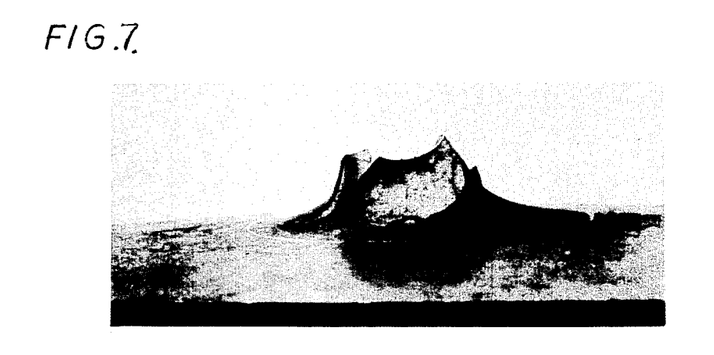
FIG. 7 is a photographic view similar to FIG. 4 of the results of the ball fracture test of the disk specimen shown in FIG. 6 taken from an oblique angle in order to illustrate the cone-shaped deformation and fracture characteristics resulting from such ball fracture test.

FIGS. 6 and 7 clearly show the very tough, ductile behavior characteristic of disks made from straight rolled SAE 1085 steel treated to maintain essentially 100% of the retained sulfide inclusions in globular shape after the rolling operation. As indicated in FIGS. 6 and 7, the breakage or fracture is of a non-directional character. It will be noted that the fractures in the disk specimen are relatively short and are of the randomly oriented shear type with a 45° orientation relative to the plane surfaces of the disk specimen. It will also be noted by comparing FIGS. 3 and 6 that the fractures of the treated disk specimen end far short of the circular impression made by the three inch diameter supporting ring on the disk surface whereas the fractures shown in FIG. 3 extend beyond the circular impression made by the three inch diameter supporting ring on the surface of the disk specimen. The fracture mode exhibited in FIGS. 6 and 7 is known as a plane stress fracture and is, as is well known, the toughest type of fracture. The fracture present in the disk specimen illustrated in FIG. 3 are of essentially the plane strain type which is a low toughness fracture mode. Repeated fracture ball tests of disk specimens treated with a sulfide inclusion shape-control agent have shown their superiority of fracture toughness and freedom from directional fracture. In fact, disk specimens made of straight rolled, SAE 1085 steel treated with zirconium to obtain shape control over the sulfide inclusions also exhibited the same very tough, ductile behavior in fracture ball tests.

Figure 1:
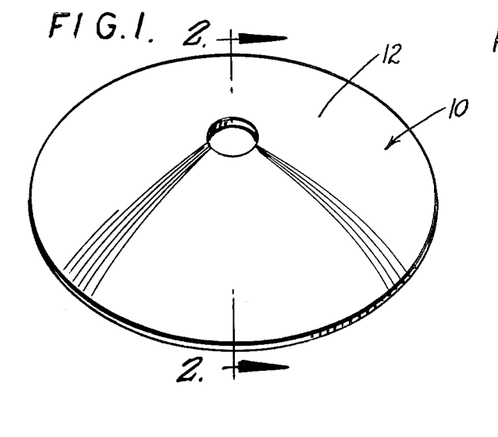
FIG. 1 is a perspective view of a typical agricultural disk.
Figure 2:
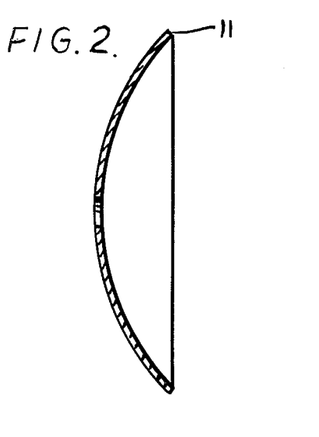
FIG. 2 is a cross-sectional view of the agricultural implement disk shown in FIG. 1 taken substantially along line 2—2 of FIG. 1.

In essence, the present invention contemplates the subjection to a heat treatment process of a disk blank which has been fabricated, as shown in FIGS. 1 and 2, from a sheet or plate made from straight rolled high carbon steel, such as SAE 1085 steel, which has been treated with a sulfide inclusion shape-control agent or additive. As pointed out hereinbefore, the disk blank is subjected to a heat treatment process wherein the heat treatment produces essentially a bainite or martensite microstructure, with substantially no amount of pearlite microstructure present. As a result of the heat treating process in conjunction with the straight rolling process of the treated SAE 1085 steel from which the disk blank is made, in combination, provide an improved structural change or result which is exemplified by random fracture of the disk as against directional cracking or fracturing as well as a disk possessing relatively high resistance to fracture. In other words, not only is the fracture toughness of the disk of the present invention substantially equal in all directions but such fracture toughness values are relatively high in comparison with conventional disks.

Extensive field tests have been conducted utilizing implement disks of the present invention. The field test which included actual disking operations in extremely rocky soil indicated that the disk specimens which were austempered and had 100% of their retained sulfide inclusions in globular form are at least equivalent to conventional disks which had been quenched and tempered and made from cross-rolled steel. During one of the field tests the two types of disks were spaced alternately on the harrows to obtain substantially equivalent loading condition in use. In similar tests conducted under substantially identical conditions, austempered disks made of straight rolled conventional disk material developed straight line fractures due to impacts with large rocks. However, the impacts with large rocks in the aforementioned field test produced short, ductile, non-directional fractures in both the disks having substantially 100% of the retained sulfides in globular form as well as in the cross-rolled steel disks. Thus, as far as directional cracking or fracturing is concerned, the cross-rolled steel disk and the disk with 100% retained globular sulfide inclusions performed substantially the same. The disks with globular sulfides utilized in the aforementioned field test were divided equally into two groups, one group being austempered to a hardness of Rockwell "C" 39-41 and the other group being austempered to a hardness of Rockwell "C" 44-46. The cross-rolled steel disk utilized in the aforementioned field test were quenched and tempered to a hardness of Rockwell "C" 42-43. Both groups of globular sulfide disks exhibited a fracture behavior equivalent to or better than the cross-rolled disk.

Although the fracture toughness and non-directional fracture character are of primary importance in agricultural implement disks, the hardness and, thus, the dent resistance and wear resistance of the disk are also important. Hence, the above finding of the one group of disks with globular sulfides and higher hardness having the same field performance as the cross-rolled steel disk will be appreciated since the achievement of higher hardness in the manufacture of agricultural implement disks is generally at the sacrifice of fracture toughness.

FIGS. 1 and 2 show a conventional agricultural implement disk 10, of dish shape, having a cutting edge 11 and a hub portion 12. The cutting edge of disks of this type may include a number of arcuate shearing edges (not shown) and disks of this type are also in some instances flat rather than dish shape construction. The invention herein disclosed being applicable to all agricultural or tillage implement or disks regardless of the shape, size or how it is to be used in operation. Furthermore, while the invention has been disclosed herein in relation to an agricultural implement disk it is to be understood that the invention can also be applied to other earth-working implements.

The embodiment of the invention chosen for the purposes of description and illustration herein is that prepared for achieving the objects of the invention and developing the utility thereof in the most desirable manner, due regard being had to existing factors of economy production methods, and the improvements sought to be perfected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A heat treated, straight rolled steel, earth-working implement disk having a carbon content of at least 0.65% and being substantially free of pearlitic microstructure, said disk having a sulphur content not exceeding a maximum of about 0.025%, a hardness in the range of approximately Rockwell "C" - 35 to 46, said disk containing a sulfide inclusion shape control agent selected from the group consisting of rare earth, Mischmetal and calcium containing additives, said shape control agent being present in an amount sufficient to render at least 40% of the retained sulfide inclusions globular in shape.

2. A heat treated, straight rolled steel, earth-working implement disk as set forth in claim 1, wherein approximately 50% of the retained sulfide inclusions are globular in shape.

3. A heat treated, straight rolled steel, earth-working implement disk as set forth in claim 1, wherein approximately 100% of the retained sulfide inclusions are globular in shape.

4. A heat treated, straight rolled steel, earth-working implement disk as set forth in claim 1, wherein said sulfide inclusion shape-control agent comprises a rare earth bearing additive.

5. A heat treated, straight rolled steel, earth-working implement disk as set forth in claim 1, wherein said sulfide inclusion shape-control agent comprises a calcium bearing additive.

6. A heat treated, straight rolled steel, earth-working implement disk as set forth in claim 1, wherein said sulfide inclusion shape-control agent comprises a cerium bearing additive.

7. A heat treated, straight rolled steel, earth-working implement disk as set forth in claim 8, wherein said sulfide inclusion shape-control agent comprises approximately 0.03 to 0.045% of cerium.

8. A heat treated, straight rolled steel, earth-working implement disk as set forth in claim 1, wherein said sulfide inclusion shape-control agent comprises approximately 0.015 to 0.10% Mischmetal.

* * * * *

UNITED STATES PATENT OFFICE
CERTIFICATE OF CORRECTION

Patent No. 4,098,622     Dated July 4, 1978

Inventor(s) Theodore M. Clarke, Gordon H. Walter

It is certified that error appears in the above-identified patent and that said Letters Patent are hereby corrected as shown below:

In Claim 7, line 2, cancel the numeral "8" and insert in lieu thereof --6--.

Signed and Sealed this

Fifteenth Day of May 1979

[SEAL]

Attest:

RUTH C. MASON
Attesting Officer

DONALD W. BANNER
Commissioner of Patents and Trademarks

REEXAMINATION CERTIFICATE (2739th)
United States Patent [19]
Clarke et al.

[11] B1 4,098,622
[45] Certificate Issued  Nov. 28, 1995

[54] EARTH-WORKING IMPLEMENT

[75] Inventors: Theodore M. Clarke, Western Springs; Gordon H. Walter, Darien, both of Ill.

[73] Assignee: Case Corporation, Racine, Wisc.

Reexamination Request:
No. 90/003,292, Dec. 30, 1993

Reexamination Certificate for:
Patent No.: 4,098,622
Issued: Jul. 4, 1978
Appl. No.: 686,616
Filed: May 14, 1976

Certificate of Correction issued May 15, 1979.

[51] Int. Cl.$^6$ ................................................. C22C 38/00
[52] U.S. Cl. .............................................. 148/331; 148/320
[58] Field of Search ............................... 148/331, 320; 420/83

[56] References Cited

U.S. PATENT DOCUMENTS 2,343,069  2/1944  Luerssen .............................. 75/123 E
2,814,580  11/1957  Hoover .................................. 148/36

FOREIGN PATENT DOCUMENTS 203420  3/1955  Australia ............................. 75/123 E
2447137  4/1975  Germany ............................. 75/126 G

OTHER PUBLICATIONS

"Effect of Sulfide Inclusions on Mechanical Properties of Ultra-High-Strength Steels," Lèon G. Sèraphin & Roland H. Tricot, pp. 338–357, from *Proceedings of an International Symposium on "Sulfide Inclusions in Steel"*, 7–8 Nov. 1974, Port Chester, New York, No. 6 in the Materials/Metal Working Series, American Society for Metals, Metals Park, Ohio 44073.

*Primary Examiner*—Deborah Yee

[57] ABSTRACT

An earth-working implement of high carbon-high hardness steel wherein the globular shape of the sulfides is retained during the manufacturing process by the addition of strong sulfide-forming additives whereby the "fracture toughness" in the rolling direction is substantially increased thereby resulting in a high strength implement possessing superior fracture resistance properties in all directions including the rolling direction.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *